Patented Oct. 14, 1947

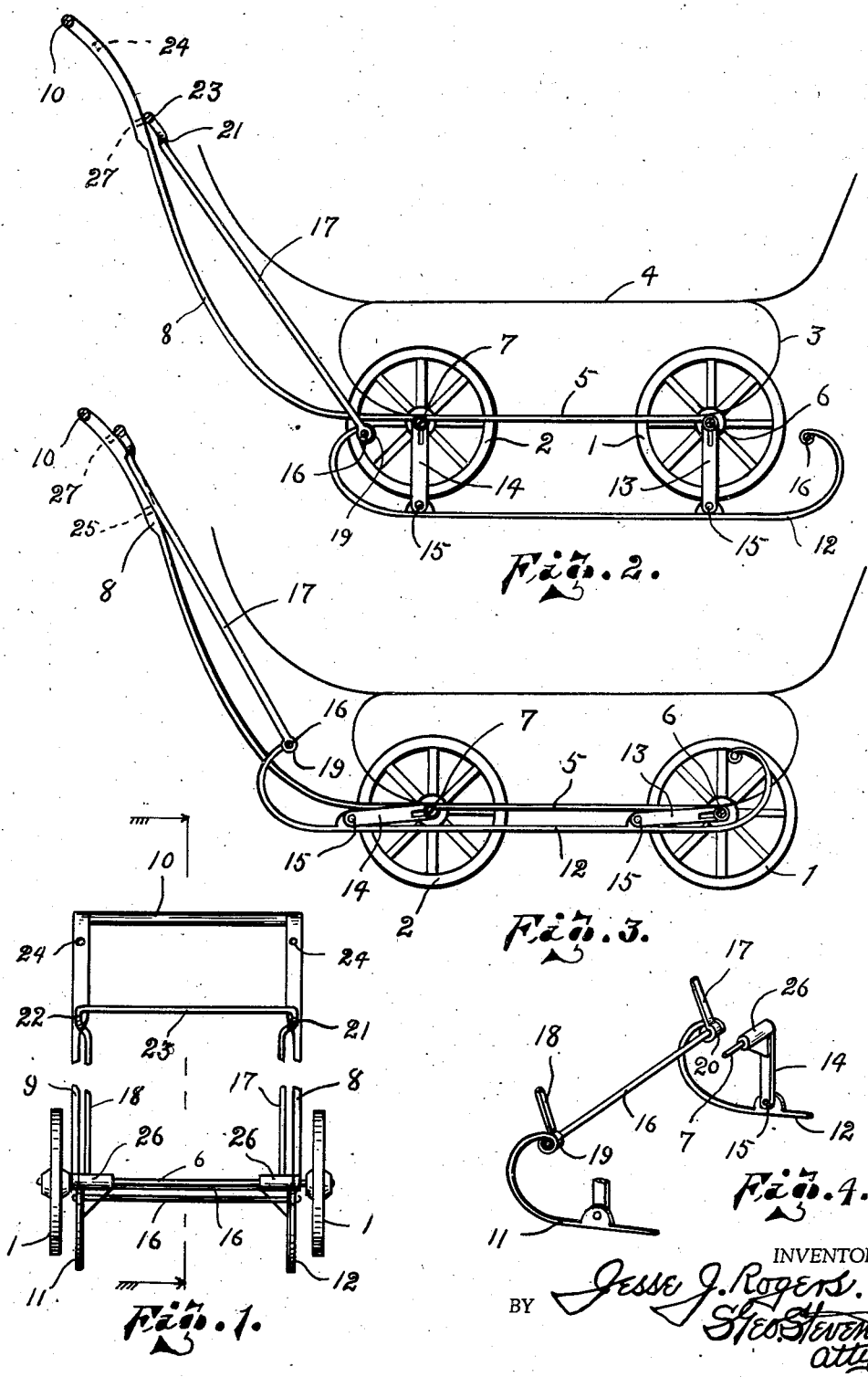

2,428,994

UNITED STATES PATENT OFFICE 2,428,994

SLED ATTACHMENT FOR BABY CARRIAGES

Jesse J. Rogers, Duluth, Minn.

Application February 1, 1946, Serial No. 644,741

3 Claims. (Cl. 280—11)

This invention relates to wheeled vehicles and has special reference to that type of vehicle having in permanent conjunction therewith manually adjustable runners rendering said vehicle selectively applicable for common conveyance upon its wheels or for sleigh-like operation over snow and ice during the winter seasons. In the instant application, the invention is shown and described as applied to a baby carriage.

One principal object of the invention is to accomplish the above with the fewest and simplest parts possible.

Another object is to provide such construction wherein the manual adjustment can be accomplished quickly and with relatively little effort.

Reference now being had to the accompanying drawing forming part of this application, wherein like reference numerals indicate like parts;

Fig. 1 is a broken front elevational view of a baby carriage chassis showing the adjustable runners extended in place for traversing the ground in sled or sleigh fashion, Fig. 2 is a section of Fig. 1 taken on the line 2—2 thereof, showing in elevation the relation of the wheels and runners of the chassis of the vehicle with the runners shown as functioning as traction means, Fig. 3 is a view similar to Fig. 2, however here showing the runners in their retracted inactive positions, and Fig. 4 is a perspective fractional view of runner attaching and control means.

In the drawing, the reference numerals 1 and 2 represent the front and rear wheels respectively of a baby carriage which support thereupon as by the common arcuate springs, as suggested by diagrammatic lines as at 3, the burden receiving portion suggested at 4 also by diagrammatic lines.

Made integral with the frame structure 5, which latter is mounted upon the axles 6 and 7 of the wheels 1 and 2, is the upwardly and backwardly projecting, relatively long pushing members 8 and 9 united by the intermediate transverse handle 10 at the uppermost extremities thereof, all of which is common to baby carriages.

Now, the invention resides in the simple runners 11 and 12 being selectively adjustable to either their retracted position as shown in Fig. 3 or to their extended operable position as shown in Fig. 2, resulting in the entire carriage functioning in a sleigh-like manner, the construction and operation of which, is described as follows:

As clearly shown in Figures 2 and 4, the carriage is supported upon the extended runners by means of the vertical brace members 13 and 14 which are, at their lowermost termini, pivoted to the runners as at 15 and to the axles 6 and 7 at their uppermost termini, as by the elongated journal bearing 26.

Thus, as is obvious from Figures 2 and 3, the runners, united by the transverse front and rear shafts or rods 16, operate in unison in pendulus fashion and are held in either of their two ultimate positions by means of the twin integral control bars 17 and 18, pivotally attached as at 19 and 20 to the runners 11 and 12 respectively. These bars 17 and 18 are inclined upwardly and backwardly until, as seen clearest in Fig. 1, they bend opposedly outwardly as at 21 and 22 and then return to form the transverse horizontal auxiliary control handle 23 which is provided with integral projecting pins 27 one at each opposite end of said horizontal auxiliary handle for reception into the holes 24 or 25 in the pushing members 8 and 9 depending upon the desired position of the runners. In Fig. 2, the pins of the auxiliary handle 23 are received into the lower holes 25 thus holding the runners in their lowermost extended position; whereas the upper holes 24 receive the pins of the auxiliary handle 23 when the runners are in their inactive retracted position.

From the foregoing, it is apparent that I have devised a simple combined sleigh and wheeled vehicle that can be readily and manually adjusted to function admirably upon either the normal wheels thereof or upon runners selectively as desired.

Having thus described my invention, what I claim is:

1. As a new article of manufacture, a runner attachment for a four-wheeled baby carriage having two transverse axles each supporting a pair of wheels at the outer extremities thereof and pushing members extending upwardly and rearwardly therefrom, said pushing members each having pin receiving means adjacent their upper ends comprising: oscillatory journals upon each of said axles one adjacent each of said wheels and inwardly thereof; a runner supporting arm fixed at one end to each of said journals; a runner pivotally carried at the opposite end of each front and rear pair of arms, the termini of each of said runners being curved upwardly; a transverse rod uniting each pair of said termini; twin integral runner control bars pivotally attached to the rearmost one of said rods and extending upwardly and rearwardly substantially parallel to said pushing members; pins extending from said control bars and adapted to be selectively engaged in said pin receiving means, so constructed and arranged that said runners may be selectively held in a lowermost active position beyond the periphery of said wheels or swung rearwardly into and held in inactive position within the periphery of said wheels.

2. As a new article of manufacture, a runner attachment for a four-wheeled baby carriage having two transverse axles each supporting a pair of wheels at the outer extremities thereof and pushing members extending upwardly and rearwardly therefrom comprising: oscillatory journals upon each of said axles one adjacent each of said wheels and inwardly thereof; a runner supporting arm fixed at one end to each of said journals; a runner pivotally carried at the opposite end of each front and rear pair of arms, the termini of each of said runners being arched upwardly; a transverse rod uniting each pair of said termini; twin integral runner control bars pivotally attached to the rearmost one of said rods and extending upwardly and rearwardly therefrom substantially parallel to said pushing members; and means extending from said control bars selectively engageable with said pushing members, so constructed and arranged that said runners may be selectively held in a lowermost active position beyond the periphery of said wheels or swung rearwardly and upwardly into and held in inactive position within the periphery of said wheels.

3. As a new article of manufacture, a sled attachment adapted for cooperative use with a baby carriage having two transverse axles each supporting a pair of wheels at their outer extremities and pushing members extending upwardly and rearwardly therefrom comprising: runner supporting arms adapted to be pivotally carried at one end on said axles, one adjacent each of said wheels and inwardly thereof; a runner pivotally carried at the opposite end of each front and rear pair of arms, the termini of each of said runners being arched upwardly; a transverse rod uniting each pair of said termini; twin integral runner control bars pivotally attached to the rearmost one of said rods and extending upwardly and rearwardly substantially parallel to said pushing members; and means extending from said control bars selectively engageable with said pushing members, so constructed and arranged that said runners may be selectively held in a lowermost active position beyond the periphery of said wheels or in inactive position within the periphery of said wheels.

JESSE J. ROGERS.

REFERENCES CITED

The following references are of record in the file of this patent:

UNITED STATES PATENTS

| Number | Name | Date |
|---|---|---|
| 527,357 | Bongfeldt | Oct. 9, 1894 |
| 572,059 | Minniss | Nov. 24, 1896 |
| 1,353,071 | Rowland | Sept. 14, 1920 |
| 1,152,774 | Whitman | Sept. 7, 1915 |